(12) United States Patent
Li

(10) Patent No.: US 11,015,973 B2
(45) Date of Patent: May 25, 2021

(54) METHOD AND APPARATUS FOR ACQUIRING AMBIENT LIGHT BRIGHTNESS BASED ON THE LUMINANCE VALUE OF THE SCREEN OF A TERMINAL DEVICE

(71) Applicant: Beijing Xiaomi Mobile Software Co., Ltd., Beijing (CN)

(72) Inventor: Guosheng Li, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 202 days.

(21) Appl. No.: 16/412,888

(22) Filed: May 15, 2019

(65) Prior Publication Data

US 2019/0353520 A1 Nov. 21, 2019

(30) Foreign Application Priority Data

May 16, 2018 (CN) .......................... 201810470413.4

(51) Int. Cl.
*G01J 1/42* (2006.01)
*H04M 1/02* (2006.01)

(52) U.S. Cl.
CPC ......... *G01J 1/4204* (2013.01); *H04M 1/0266* (2013.01); *H04M 2250/12* (2013.01)

(58) Field of Classification Search
CPC . G01J 1/4204; G06T 15/50; G09G 2360/144; G09G 2360/16; H04M 1/0266; H04M 2250/12

USPC ........................................ 250/214 AL, 214 R
See application file for complete search history.

(56) References Cited

U.S. PATENT DOCUMENTS

| 8,466,907 B2 * | 6/2013 | Bell .......................... G09G 5/10 345/207 |
| 9,622,326 B1 | 4/2017 | Devyver et al. |
| 2017/0092228 A1 | 3/2017 | Cote et al. |
| 2018/0293958 A1 | 10/2018 | Cote et al. |

FOREIGN PATENT DOCUMENTS

| CN | 104180897 A | 12/2014 |
| CN | 204241104 U | 4/2015 |
| CN | 106248223 A | 12/2016 |
| CN | 107223203 A | 9/2017 |
| CN | 107507601 A | 12/2017 |
| CN | 107818753 A | 3/2018 |
| WO | WO 2013/094091 A1 | 6/2013 |

OTHER PUBLICATIONS

Extended European Search Report dated May 29, 2019, in Patent Application No. 19171791.7, 10 pages.

(Continued)

*Primary Examiner* — Que Tan Le
(74) *Attorney, Agent, or Firm* — Oblon, McClelland, Maier & Neustadt, L.L.P.

(57) ABSTRACT

The present disclosure relates to a method and apparatus for acquiring an ambient light brightness. The method includes acquiring a brightness value monitored by the ambient light sensor; acquiring a luminance value of the screen of the terminal device; and determining an ambient light brightness value of an external environment based on the brightness value and the luminance value.

15 Claims, 14 Drawing Sheets

(56) References Cited

OTHER PUBLICATIONS

Combined Chinses Office Action and Search Report dated Dec. 23, 2019 in Chinese Patent Application No. 201810470413.4, 8 pages.
Second Office Action dated Sep. 4, 2020 in Chinese Patent Application No. 201810470413.4, 10 pages.
Chinese Office Action dated Mar. 31, 2021 in corresponding Chinese Patent Application No. 201810470413.4, 9 pages.

* cited by examiner

METHOD AND APPARATUS FOR ACQUIRING AMBIENT LIGHT BRIGHTNESS BASED ON THE LUMINANCE VALUE OF THE SCREEN OF A TERMINAL DEVICE

CROSS-REFERENCE TO RELATED APPLICATIONS

This application is based upon and claims priority to Chinese Patent Application No. 201810470413.4, filed May 16, 2018, the entire contents of which are incorporated herein by reference.

TECHNICAL FIELD

The present disclosure relates to the technical field of terminal devices, and in particular, to a method and apparatus for acquiring an ambient light brightness.

BACKGROUND

With the rapid development of electronic technology, electronic devices such as smart phones and tablet computers have become more and more popular. Among them, the smart phones, the tablet computers and other terminal devices all have display screens.

Typically, an ambient light sensor is placed below the display screen. The ambient light sensor is used to detect the brightness of the ambient light, so that the electronic device can control the brightness of the display screen according to the detected ambient light brightness, and thus the brightness of the display screen is adapted to the external environment.

SUMMARY

This Summary is provided to introduce a selection of aspects of the present disclosure in a simplified form that are further described below in the Detailed Description. This Summary is not intended to identify key features or essential features of the claimed subject matter, nor is it intended to be used to limit the scope of the claimed subject matter.

Aspects of the disclosure provide a method for acquiring an ambient light brightness, wherein the method is applied to a terminal device, and an ambient light sensor is disposed at a lower layer of a screen of the terminal device. The method includes acquiring a brightness value monitored by the ambient light sensor; acquiring a luminance value of the screen of the terminal device; and determining an ambient light brightness value of an external environment based on the brightness value and the luminance value.

According to an aspect, when acquiring the luminance value, the method further includes acquiring the luminance value of a preset display area of the screen of the terminal device, the preset display area on the screen of the terminal device being an area of the screen of the terminal device that affects a sensing ability of the ambient light sensor to sense the ambient light brightness of the external environment. Also, when determining the ambient light brightness value of the external environment, the method further includes determining the ambient light brightness value of the external environment based on the brightness value and the luminance value of the preset display area.

According to another aspect, when acquiring the luminance value of the preset display area of the screen of the terminal device, the method further includes acquiring a luminance value of each pixel in the preset display area; determining an actual luminance influence value of an $i^{th}$ pixel based on a luminance value of the $i^{th}$ pixel and a light intensity influence weight value of the $i^{th}$ pixel with respect to the ambient light sensor, i being an integer greater than 1; and acquiring the luminance value of the preset display area based on the actual luminance influence values of all the pixels.

According to yet another aspect, when determining the ambient light brightness value of the external environment based on the brightness value monitored by the ambient light sensor and the luminance value of the preset display area, the method further includes calculating a brightness difference value between the brightness value monitored by the ambient light sensor and the luminance value of the display area; and determining the ambient light brightness value of the external environment based on the brightness difference value.

According to yet another aspect, when determining the ambient light brightness value of the external environment based on the light brightness difference value, the method further includes determining the ambient light brightness value of the external environment based on the brightness difference value and a light transmittance of the screen of the terminal device.

Aspects of the disclosure also provide an apparatus for acquiring an ambient light brightness, wherein the apparatus is applied to a terminal device, and an ambient light sensor is disposed at a lower layer of a screen of the terminal device. The apparatus includes a processor and a memory for storing instructions executable by the processor. The processor is configured to acquire a brightness value monitored by the ambient light sensor; acquire a luminance value of the screen of the terminal device; and determine an ambient light brightness value of an external environment based on the brightness value and the luminance value.

Aspects of the disclosure also provide a non-transitory computer-readable storage medium having stored thereon instructions, wherein the non-transitory computer-readable storage medium is applied to a terminal device, and an ambient light sensor is disposed at a lower layer of a screen of the terminal device, and when the instructions are executed by a processor of the terminal device, the instructions cause the processor to acquire a brightness value monitored by the ambient light sensor; acquire a luminance value of the screen of the terminal device; and determine an ambient light brightness value of an external environment based on the brightness value and the luminance value.

It is to be understood that both the foregoing general description and the following detailed description are illustrative and explanatory only and are not restrictive of the present disclosure.

BRIEF DESCRIPTION OF THE DRAWINGS

The accompanying drawings, which are incorporated in and constitute a part of this specification, illustrate aspects consistent with the present disclosure and, together with the description, serve to explain the principles of the present disclosure.

The specific aspects of the present disclosure, which have been illustrated by the accompanying drawings described above, will be described in detail below. These accompanying drawings and description are not intended to limit the scope of the present disclosure in any manner, but to explain the concept of the present disclosure to those skilled in the art via referencing specific aspects.

DETAILED DESCRIPTION

Reference will now be made in detail to exemplary aspects, examples of which are illustrated in the accompanying drawings. The following description refers to the accompanying drawings in which the same numbers in different drawings represent the same or similar elements unless otherwise represented. The implementations set forth in the following description of exemplary aspects do not represent all implementations consistent with the disclosure. Instead, they are merely examples of apparatuses and methods consistent with aspects related to the disclosure as recited in the appended claims.

Figure 1:
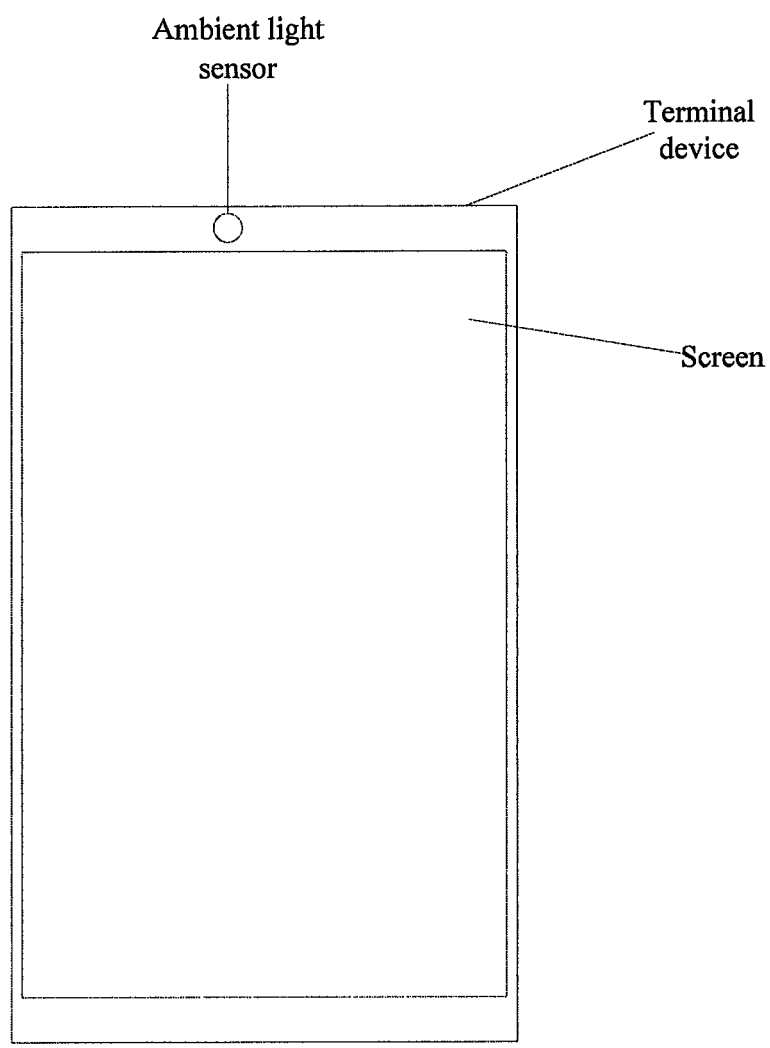
FIG. 1 is a schematic diagram showing a position of an ambient light sensor in the related art according to an exemplary aspect of the present disclosure.

FIG. 1 is a schematic diagram showing a position of an ambient light sensor in the related art according to an exemplary aspect. As shown in FIG. 1, since most of the mobile phones have large upper and lower borders and there is enough space for placing the ambient light sensor (light sensor), the ambient light sensor is placed outside the screen.

Figure 2:
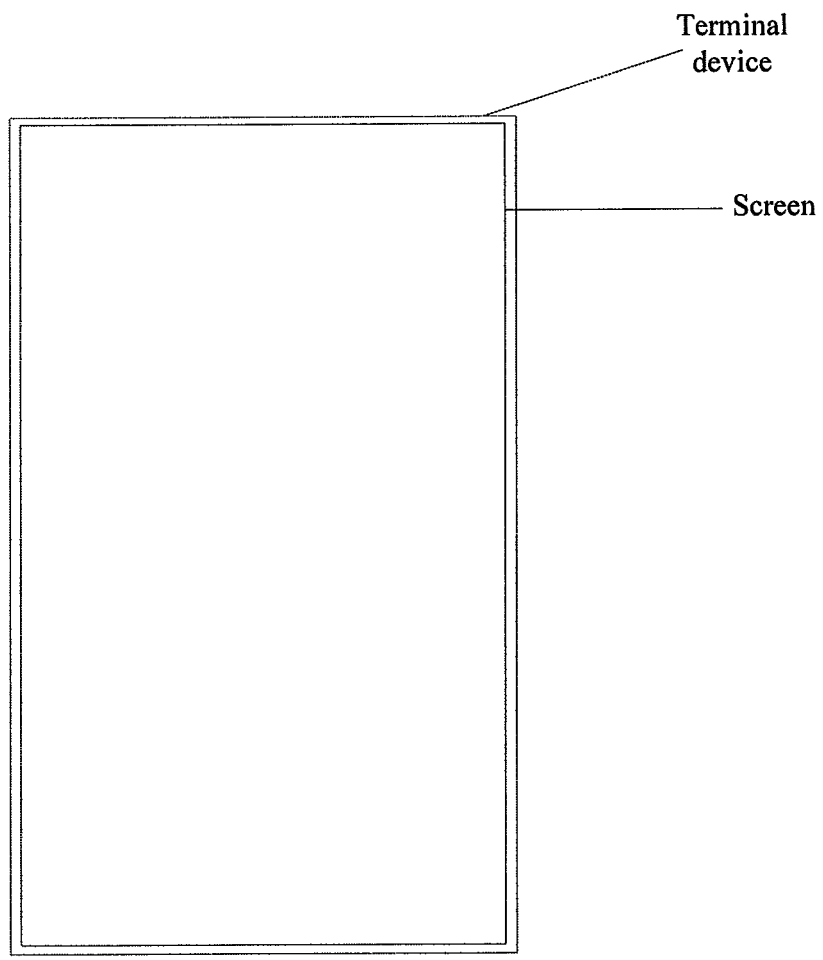
FIG. 2 is a structural diagram of a mobile phone according to an exemplary aspect of the present disclosure.
Figure 3:
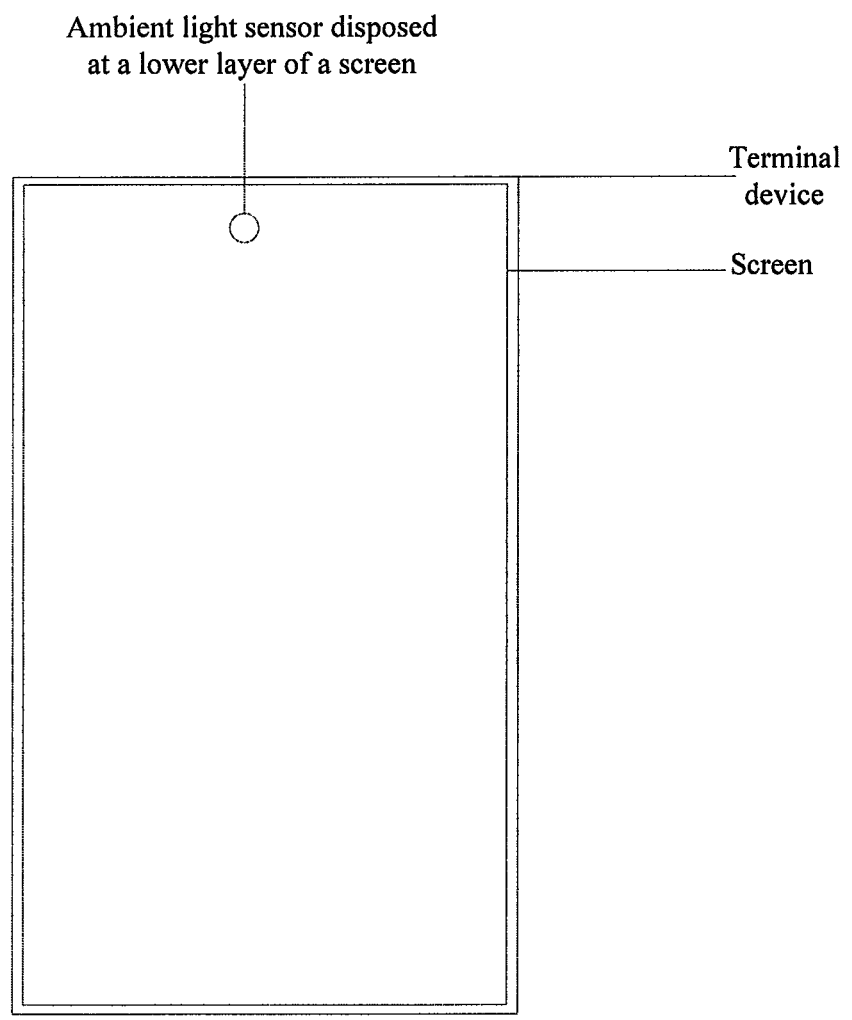
FIG. 3 is a schematic diagram showing a position of an ambient light sensor according to an exemplary aspect of the present disclosure.
Figure 4:
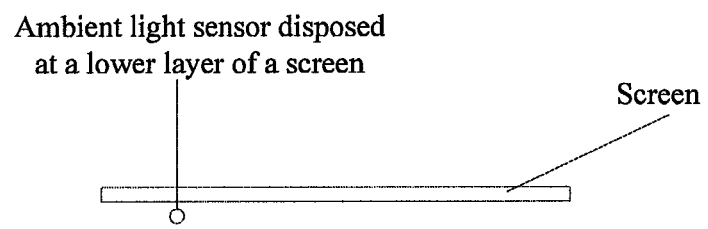
FIG. 4 is a side view of the position of the ambient light sensor according to an exemplary aspect of the present disclosure.

As shown in FIG. 2, as a screen ratio of the screen is getting larger and larger, when the front of the mobile phone is almost occupied by the screen, there is no place for placing the device such as the light sensor. In such kind of structure, as shown in FIG. 3 and FIG. 4 (FIG. 4 is a side view of FIG. 3), since the screen of the organic light-emitting diode (Organic Light-Emitting Diode, OLED for short) has a certain transparency, if the light sensor is placed on the lower layer of the screen, the light sensor can sense the external light intensity. Therefore, as the screen ratio of the screen becomes higher and higher, it is a good choice to place the light sensor on the lower layer of the screen.

It is worth noting that when the screen has a plurality of layers, the ambient light sensor may be placed anywhere on any layer of the screen, or may be placed anywhere on the lowermost layer of the screen. The present disclosure does not limit the position of the ambient light sensor.

Based on the above structure, since the ambient light sensor is placed on the lower layer of the screen, and the screen itself is also a device for emitting light, it inevitably affects the ambient light sensor for sensing the ambient light intensity. Therefore, the present disclosure proposes a method for acquiring an ambient light brightness.

Figure 5:
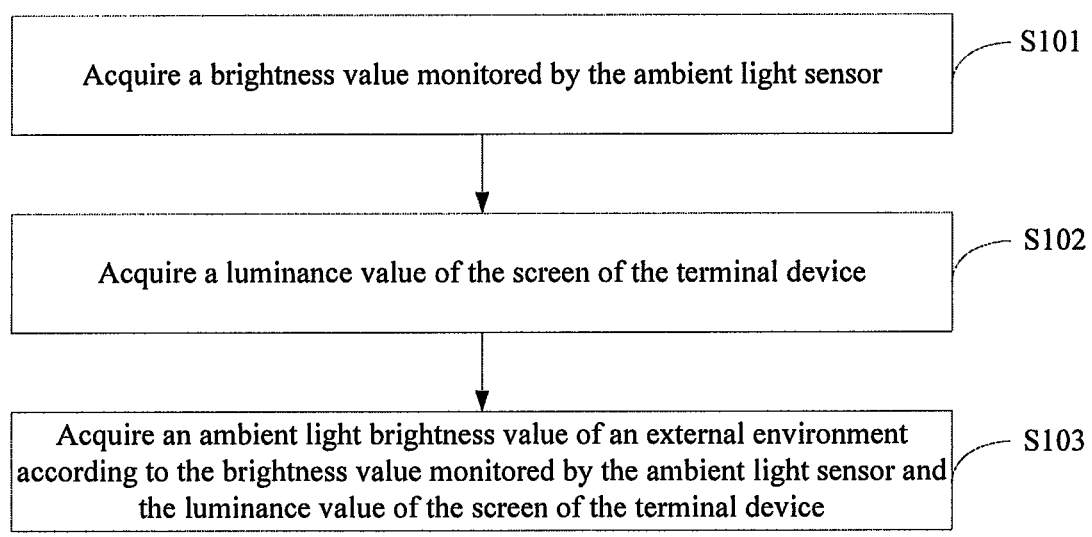
FIG. 5 is a flowchart of a method for acquiring an ambient light brightness according to an exemplary aspect of the present disclosure.

FIG. 5 is a flowchart of a method for acquiring an ambient light brightness according to an exemplary aspect. As shown in FIG. 5, the method is used in a terminal device, and an ambient light sensor is disposed on a lower layer of a screen of the terminal device, and the method includes the following steps S101-S103.

In step S101, a brightness value monitored by the ambient light sensor is acquired.

In step S102, a luminance value of the screen of the terminal device is acquired.

In step S103, an ambient light brightness value of an external environment is acquired according to the brightness value monitored by the ambient light sensor and the luminance value of the screen of the terminal device.

The brightness value is monitored by the ambient light sensor. At this time, the brightness value monitored by the ambient light sensor includes not only the ambient light brightness value of the external environment but also the luminance value of the screen of the terminal device. In order to acquire the ambient light brightness value of the external environment, it is also necessary to acquire the luminance value of the screen of the terminal device, and then the ambient light brightness value of the external environment may be acquired by the brightness value monitored by the ambient light sensor and the luminance value of the screen of the terminal device.

The technical solution provided by the aspects of the present disclosure may include the following advantageous effects: the brightness value monitored by the ambient light sensor and the luminance value of the screen of the terminal device are acquired, and the ambient light brightness value of the external environment is acquired according to the brightness value monitored by the ambient light sensor and the luminance value of the screen of the terminal device. When the ambient light sensor is disposed on the lower layer of the screen of the terminal device, the brightness value of the ambient light sensor and the luminance value of the screen of the terminal device can be used to acquire the ambient light brightness value of the external environment, thereby effectively improving the accuracy of the acquired ambient light brightness value of the external environment.

In an aspect, the above step S102 includes the following sub-step A1, and the above step S103 includes the following sub-step A2.

In A1, a luminance value of a preset display area of the screen of the terminal device is acquired; the preset display area of the screen of the terminal device being an area of the screen of the terminal device that affects the ambient light sensor to sense the ambient light brightness of the external environment.

In A2, the ambient lightness value of the external environment is acquired according to the brightness value monitored by the ambient light sensor and the luminance value of the display area.

Figure 6:
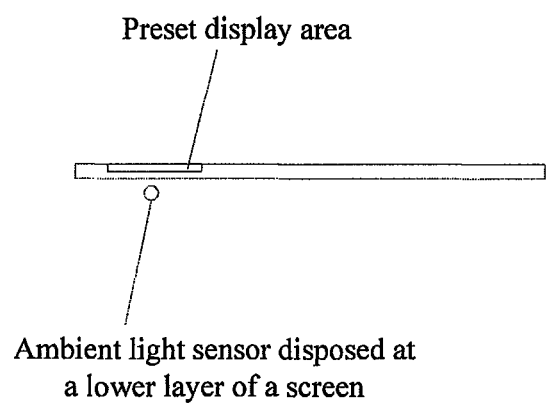
FIG. 6 is a schematic diagram of a preset display area according to an exemplary aspect of the present disclosure.

Since the range of light that can be sensed by the ambient light sensor is limited, as shown in FIG. 6, a preset display area in the screen of the terminal device may be determined in advance, and the preset display area is an area in the screen of the terminal device that affects the ambient light sensor to sense the ambient light brightness of the external environment.

Figure 7:
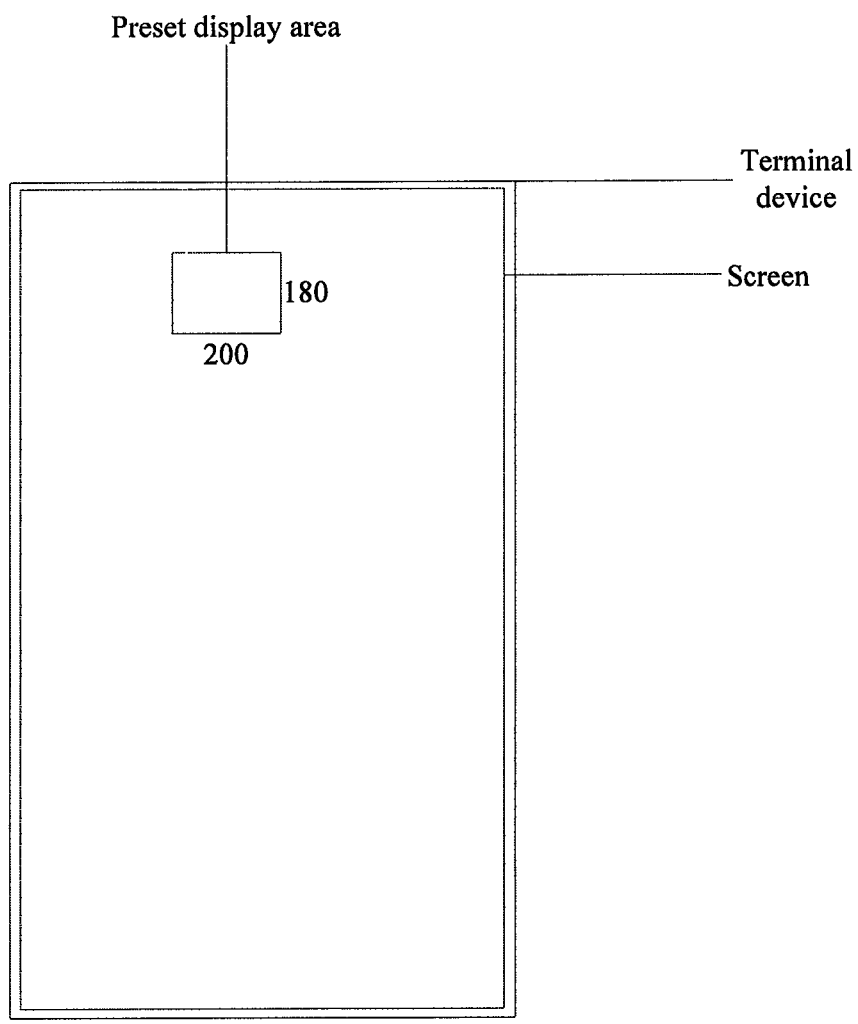
FIG. 7 is a schematic diagram of a preset display area according to an exemplary aspect of the present disclosure.

By way of example, as shown in FIG. 7, there are many pixels of 200×180 that affect the ambient light sensing of the ambient light sensor.

Based on the above description, when determining the ambient light brightness value of the external environment, the luminance value of the preset display area of the screen of the terminal device may be acquired instead of the luminance value of the entire screen, thereby effectively improving the accuracy of the acquired ambient light brightness value of the external environment.

In one aspect, the above step A1 includes the following sub-steps B1-B3.

In B1, the luminance value of each pixel in the preset display area is acquired.

In B2, an actual luminance influence value of the $i^{th}$ pixel is determined according to the luminance value of the $i^{th}$ pixel and a light intensity influence weight value of the $i^{th}$ pixel with respect to the ambient light sensor; i being an integer greater than 1. In B3, the luminance value of the display area is acquired based on the actual luminance influence values of all the pixels.

The screen is composed of many pixels. The display content of the preset area is sent by the application processor (Application Processor, AP for short) to the screen, so the display content is known, and the luminance value of each pixel may be calculated by the display content. In combination with the light intensity influence weight value of the pixel at the corresponding position with respect to the ambient light sensor, the actual luminance influence value of each sub-pixel with respect to the ambient light sensor may be acquired.

For example, the luminance value of the display area may be calculated by the following formula:

$$I = \sum_{i=1}^{m} K_i \times B_i$$

where I represents the luminance value of the display area; $K_i$ represents the light intensity influence weight value of the $i^{th}$ pixel with respect to the ambient light sensor (the weight value of affecting the light intensity of the ambient light sensor by the pixel), and $K_i$ is between 0 and 1, which is determined by a relative positional relationship between the pixel and the ambient light sensor; $B_1$ is the luminance value of the $i^{th}$ pixel, which is jointly determined by the characteristic of the screen itself, the displayed gray scale, and the brightness characteristics of the red, green, and blue. The brightness of each screen is determined by the characteristics of the screen itself. Different brightness is displayed by different gray scales (0~255), 255 shows the maximum brightness, and 0 shows the lowest brightness. Different colors including red, green and blue have different effects on brightness, and the corresponding luminance brightness value may be acquired by gamma curve. m is the number of pixels in the preset display area.

For example, the light intensity influence weight value of the $i^{th}$ pixel with respect to the ambient light sensor may be experimentally measured.

The actual luminance influence value is determined by combining the luminance value of the pixel and the light intensity influence weight value of the pixel on the ambient light sensor, thereby improving the accuracy of the luminance value of the display area.

In one aspect, the above step A2 includes the following sub-steps C1-C2.

In C1, a brightness difference value between the brightness value monitored by the ambient light sensor and the luminance value of the display area is calculated.

In C2, the ambient light brightness value of the external environment is acquired according to the brightness difference value.

When the ambient light sensor is disposed on the lower screen of the terminal device, the brightness value detected by the ambient light sensor includes not only the ambient light brightness value of the external environment but also the luminance value of the display area, and thus the ambient light brightness value of the external environment may be acquired by calculating the difference between the brightness value monitored by the ambient light sensor and the luminance value of the display area.

In an aspect, the above step C2 may be implemented as a sub-step: the brightness difference value between the brightness value monitored by the ambient light sensor and the luminance value of the display area may be directly used as the ambient light brightness value of the external environment.

For example, if the calculated difference is 50 Lux, then the ambient light brightness value of the external environment is determined to be 50 Lux.

In another aspect, since the screen has a certain light transmittance, there may be a loss of the external light when it is irradiated to the ambient light sensor through the screen. In order to improve the accuracy of acquiring the ambient light brightness value of the external environment, the above step C2 may be implemented as the following sub-steps: after calculating the brightness difference between the brightness value monitored by the ambient light sensor and the luminance value of the display area, the ambient light brightness value of the external environment may be acquired according to the brightness difference and the transmittance of the screen of the terminal device.

For example, if the calculated difference is 50 Lux and the transmittance of the screen is 50%, then the ambient light brightness value of the external environment is determined to be $$\frac{50Lux}{50\%} = 100Lux.$$

Figure 8:
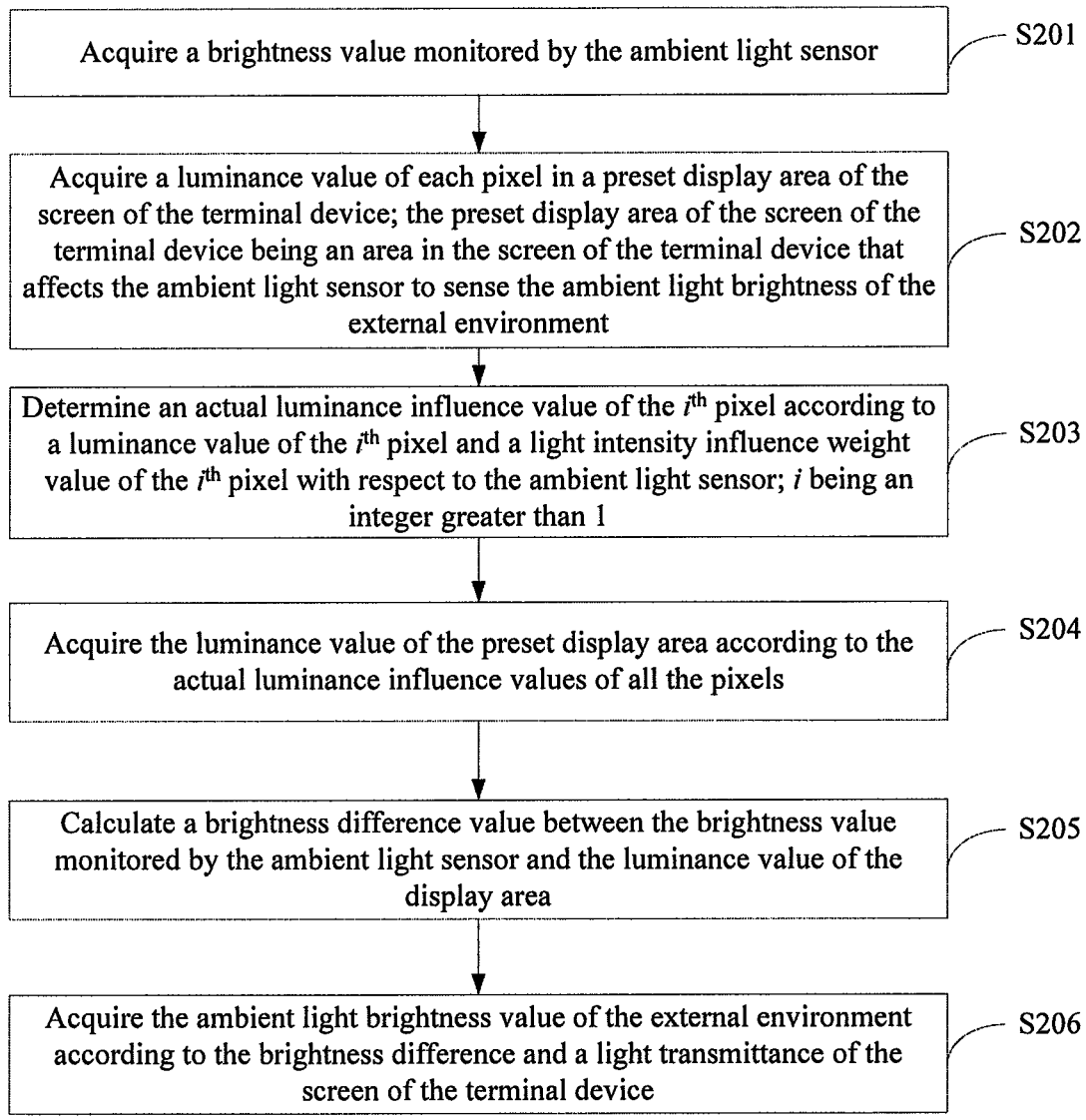
FIG. 8 is a flowchart of a method for acquiring an ambient light brightness according to an exemplary aspect of the present disclosure.

FIG. 8 is a flowchart of a method for acquiring an ambient light brightness according to an exemplary aspect. The method is applied to a terminal device, and an ambient light sensor is disposed on a lower layer of the screen of the terminal device. As shown in FIG. 8, the method includes the following steps.

In step S201, a brightness value monitored by the ambient light sensor is acquired.

In step S202, a luminance value of each pixel in a preset display area of the screen of the terminal device is acquired; the preset display area of the screen of the terminal device being an area in the screen of the terminal device that affects the ambient light sensor to sense the ambient light brightness of the external environment.

In step S203, an actual luminance influence value of the $i^{th}$ pixel is determined according to a luminance value of the $i^{th}$ pixel and a light intensity influence weight value of the $i^{th}$ pixel with respect to the ambient light sensor; i being an integer greater than 1.

In step S204, the luminance value of the preset display area is acquired according to the actual luminance influence values of all the pixels.

In step S205, a brightness difference value between the brightness value monitored by the ambient light sensor and the luminance value of the display area is calculated.

In step S206, the ambient light brightness value of the external environment is acquired according to the brightness difference and a light transmittance of the screen of the terminal device.

The ambient light sensor may be placed below the screen, which makes it easy to implement a full screen. At the same time, the brightness value detected by the ambient light sensor is corrected by the luminance value corresponding to the display content of the preset display area, so that the accurate ambient light brightness value of the external environment can be acquired.

The following is an apparatus aspect of the present disclosure, which may be used to implement the method aspects of the present disclosure.

Figure 9:
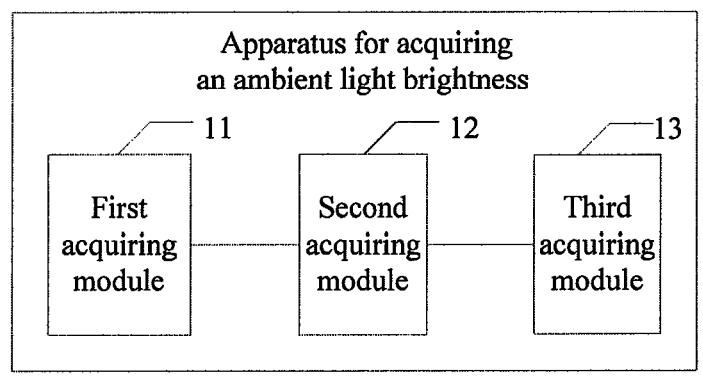
FIG. 9 is a block diagram of an apparatus for acquiring an ambient light brightness according to an exemplary aspect of the present disclosure.

FIG. 9 is a block diagram of an apparatus for acquiring an ambient light brightness according to an exemplary aspect, which may be implemented as part or all of an electronic device by software, hardware, or a combination of both. As shown in FIG. 9, the apparatus for acquiring an ambient light brightness includes: a first acquiring module 11, a second acquiring module 12, and a third acquiring module 13.

The first acquiring module 11 is configured to acquire a brightness value monitored by the ambient light sensor.

The second acquiring module 12 is configured to acquire a luminance value of the screen of the terminal device.

The third acquiring module 13 is configured to acquire an ambient light brightness value of an external environment according to the brightness value detected by the ambient light sensor acquired by the first acquiring module 11 and the luminance value of the screen of the terminal device acquired by the second acquiring module 12.

Figure 10:
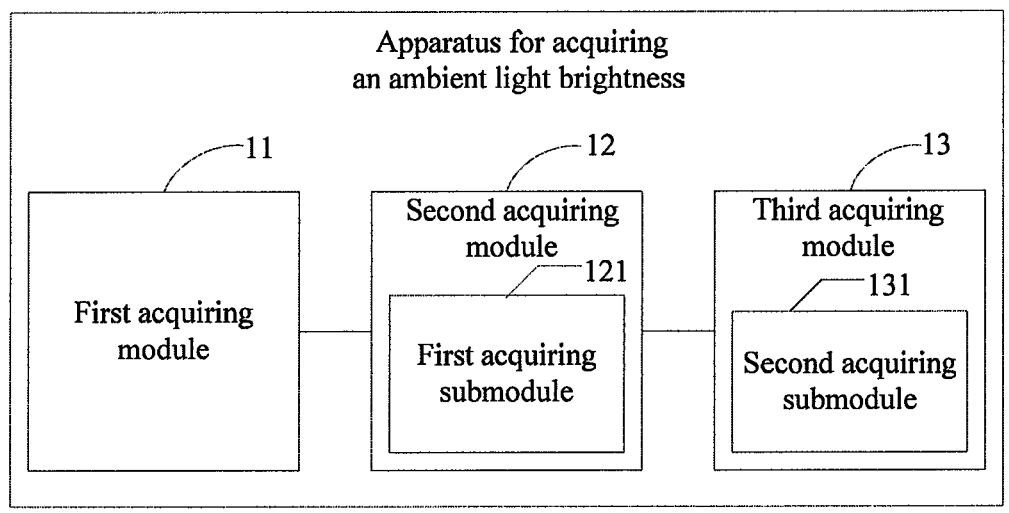
FIG. 10 is a block diagram of an apparatus for acquiring an ambient light brightness according to an exemplary aspect of the present disclosure.

In an aspect, as shown in FIG. 10, the second acquiring module 12 includes: a first acquiring submodule 121; and the third acquiring module 13 includes: a second acquiring submodule 131.

The first acquiring submodule 121 is configured to acquire a luminance value of a preset display area of the screen of the terminal device; the preset display area of the screen of the terminal device being an area on the screen of the terminal device that affects the ambient light sensor to sense the ambient light brightness of the external environment.

The second acquiring submodule 131 is configured to: acquire the ambient light brightness value of the external environment according to the brightness value detected by the ambient light sensor acquired by the first acquiring module 11 and the luminance value of the preset display area acquired by the first acquiring submodule 121.

Figure 11:
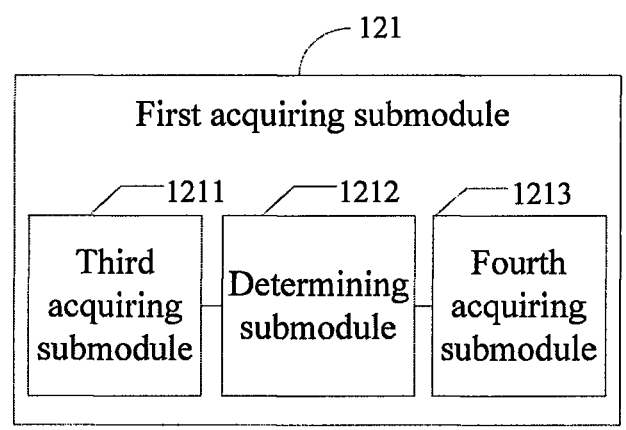
FIG. 11 is a block diagram of a first acquiring submodule in the apparatus for acquiring an ambient light brightness according to a second exemplary aspect of the present disclosure.

In an aspect, as shown in FIG. 11, the first acquiring submodule 121 includes: a third acquiring submodule 1211, a determining submodule 1212, and a fourth acquiring submodule 1213.

The third acquiring submodule 1211 is configured to acquire a luminance value of each pixel in the preset display area.

The determining submodule 1212 is configured to determine an actual luminance influence value of the $i^{th}$ pixel according to a luminance value of the $i^{th}$ pixel acquired by the third acquiring submodule 1211 and a light intensity influence weight value of the $i^{th}$ pixel with respect to the ambient light sensor, i being an integer greater than;

The fourth acquiring submodule 1213 is configured to acquire the luminance value of the preset display area according to the actual luminance influence values of all the pixels determined by the determining submodule 1212.

Figure 12:
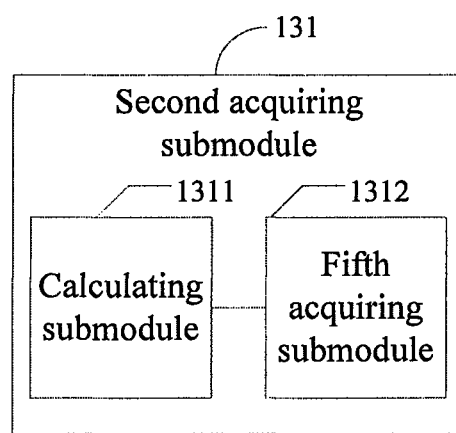
FIG. 12 is a block diagram of a second acquiring submodule in the apparatus for acquiring an ambient light brightness according to the second exemplary aspect of the present disclosure.

In an aspect, as shown in FIG. 12, the second acquiring submodule 131 includes: a calculating submodule 1311 and a fifth acquiring submodule 1312;

The calculating submodule 1311 is configured to calculate a brightness difference value between the brightness value monitored by the ambient light sensor acquired by the first acquiring module 11 and the luminance value of the display area acquired by the first acquiring submodule 121.

The fifth acquiring submodule 1312 is configured to acquire an ambient light brightness value of the external environment according to the brightness difference value calculated by the calculating submodule 1311.

Figure 13:
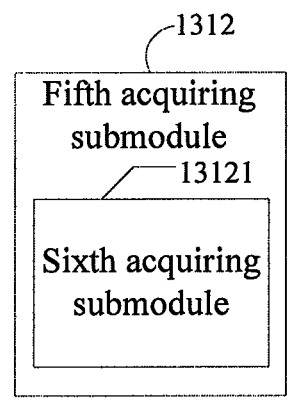
FIG. 13 is a block diagram of a fifth acquiring submodule in the apparatus for acquiring an ambient light brightness according to the second exemplary aspect of the present disclosure.

In an aspect, as shown in FIG. 13, the fifth acquiring submodule 1312 includes: a sixth acquiring submodule 13121.

The sixth acquiring submodule 13121 is configured to acquire the ambient light brightness value of the external environment according to the brightness difference value calculated by the calculating submodule 1311 and a light transmittance of the screen of the terminal device.

According to a third aspect of the aspects of the present disclosure, there is provided an apparatus for acquiring an ambient light brightness, the apparatus being applied to a terminal device, and an ambient light sensor being disposed at a lower layer of a screen of the terminal device, the apparatus further including:

a processor; and a memory for storing instructions executable by the processor;

wherein the processor is configured to:

acquire a brightness value monitored by the ambient light sensor;

acquire a luminance value of the screen of the terminal device; and acquire an ambient light brightness value of an external environment according to the brightness value monitored by the ambient light sensor and the luminance value of the screen of the terminal device.

The above processor may also be configured to:

the acquiring the luminance value of the screen of the terminal device includes:

acquiring a luminance value of a preset display area of the screen of the terminal device, the preset display area on the screen of the terminal device being an area of the screen of the terminal device that affects the ambient light sensor to sense the ambient light brightness of the external environment; and the acquiring the ambient light brightness value of the external environment according to the brightness value monitored by the ambient light sensor and the luminance value of the screen of the terminal device, includes:

acquiring the ambient light brightness value of the external environment according to the brightness value monitored by the ambient light sensor and the luminance value of the preset display area.

The acquiring the luminance value of the preset display area of the screen of the terminal device includes:

acquiring a luminance value of each pixel in the preset display area;

determining an actual luminance influence value of the $i^{th}$ pixel according to a luminance value of the $i^{th}$ pixel and a light intensity influence weight value of the $i^{th}$ pixel with respect to the ambient light sensor, i being an integer greater than 1; and acquiring the luminance value of the preset display area according to the actual luminance influence values of all the pixels.

The acquiring the ambient light brightness value of the external environment according to the brightness value monitored by the ambient light sensor and the luminance value of the preset display area, includes:

calculating a brightness difference value between the brightness value monitored by the ambient light sensor and the luminance value of the display area; and acquiring the ambient light brightness value of the external environment according to the brightness difference value.

the acquiring the ambient light brightness value of the external environment according to the light brightness difference value includes:

acquiring the ambient light brightness value of the external environment according to the brightness difference value and a light transmittance of the screen of the terminal device.

Figure 14:
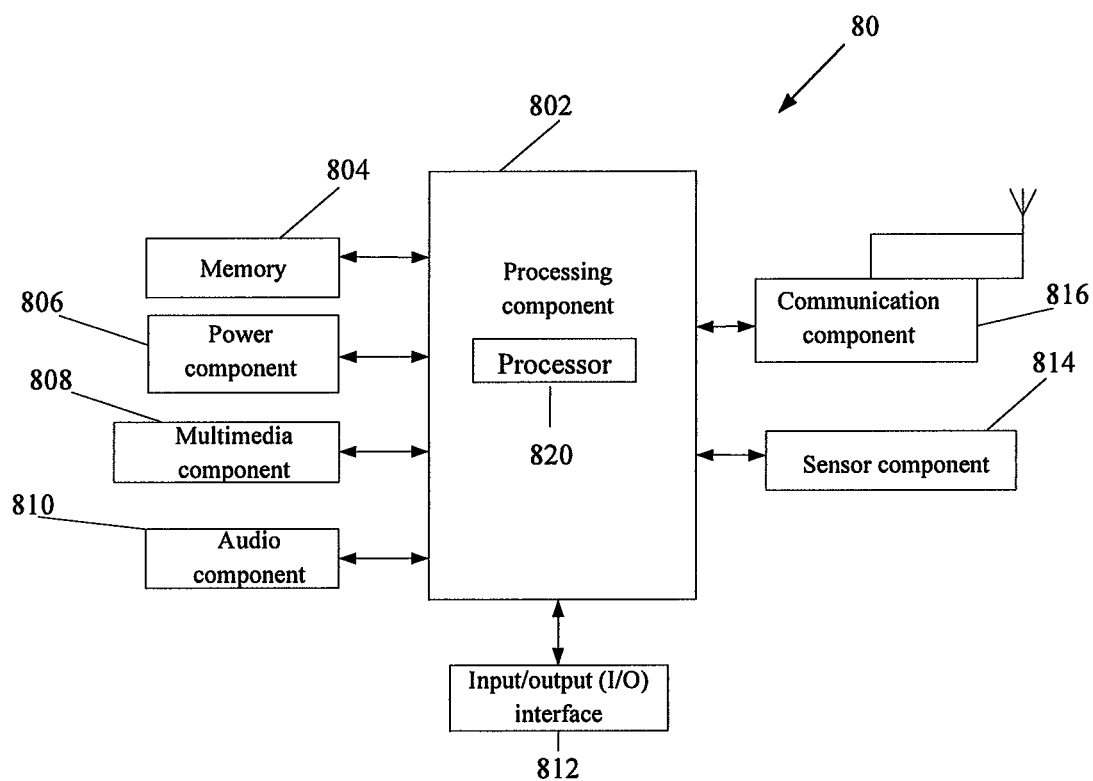
FIG. 14 is a block diagram of an apparatus for acquiring an ambient light brightness 80 according to an exemplary aspect of the present disclosure.

FIG. 14 is a block diagram of an apparatus 80 for acquiring an ambient light brightness according to an exemplary aspect. The apparatus is applicable to the terminal device. For example, the apparatus 80 may be a mobile phone, a computer, a digital broadcast terminal, a messaging device, a gaming console, a tablet, a medical device, exercise equipment, a personal digital assistant, and the like.

The apparatus 80 may include one or more of the following components: a processing component 802, a memory 804, a power component 806, a multimedia component 808, an audio component 810, an input/output (I/O) interface 812, a sensor component 814, and a communication component 816.

The processing component 802 typically controls overall operations of the apparatus 80, such as the operations associated with display, telephone calls, data communications, camera operations, and recording operations. The processing component 802 may include one or more processors 820 to execute instructions to perform all or part of the steps in the above described methods. Moreover, the processing component 802 may include one or more modules which facilitate the interaction between the processing component 802 and other components. For instance, the processing component 802 may include a multimedia module to facilitate the interaction between the multimedia component 808 and the processing component 802.

The memory 804 is configured to store various types of data to support the operation of the apparatus 80. Examples of such data include instructions for any applications or methods operated on the apparatus 80, contact data, phonebook data, messages, pictures, video, etc. The memory 804 may be implemented using any type of volatile or non-volatile memory devices, or a combination thereof, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic or optical disk.

The power component 806 provides power to various components of the apparatus 80. The power component 806 may include a power management system, one or more power sources, and any other components associated with the generation, management, and distribution of power in the apparatus 80.

The multimedia component 808 includes a screen providing an output interface between the apparatus 80 and the user. In some aspects, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a period of time and a pressure associated with the touch or swipe action. In some aspects, the multimedia component 808 includes a front camera and/or a rear camera. The front camera and/or the rear camera may receive an external multimedia datum while the apparatus 80 is in an operation mode, such as a photographing mode or a video mode. Each of the front camera and the rear camera may be a fixed optical lens system or have focus and optical zoom capability.

The audio component 810 is configured to output and/or input audio signals. For example, the audio component 810 includes a microphone ("MIC") configured to receive an external audio signal when the device 80 is in an operation mode, such as a call mode, a recording mode, and a voice recognition mode. The received audio signal may be further stored in the memory 804 or transmitted via the communication component 816. In some aspects, the audio component 810 further includes a speaker to output audio signals.

The I/O interface 812 provides an interface between the processing component 802 and peripheral interface modules, such as a keyboard, a click wheel, buttons, and the like. The buttons may include, but are not limited to, a home button, a volume button, a starting button, and a locking button.

The sensor component 814 includes one or more sensors to provide status assessments of various aspects of the apparatus 80. For instance, the sensor component 814 may detect an open/closed status of the apparatus 80, relative positioning of components, e.g., the display and the keypad, of the apparatus 80, a change in position of the apparatus 80 or a component of the apparatus 80, a presence or absence of user contact with the apparatus 80, an orientation or an acceleration/deceleration of the apparatus 80, and a change in temperature of the apparatus 80. The sensor component 814 may include a proximity sensor configured to detect the presence of nearby objects without any physical contact. The sensor component 814 may also include a light sensor, such as a CMOS or CCD image sensor, for use in imaging applications. In some aspects, the sensor component 814 may also include an accelerometer sensor, a gyroscope sensor, a magnetic sensor, a pressure sensor, or a temperature sensor.

The communication component 816 is configured to facilitate communication, wired or wirelessly, between the apparatus 80 and other devices. The apparatus 80 can access a wireless network based on a communication standard, such as WiFi, 2G, or 3G, or a combination thereof. In one exemplary aspect, the communication component 816 receives a broadcast signal or broadcast associated information from an external broadcast management system via a broadcast channel. In one exemplary aspect, the communication component 816 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In exemplary aspects, the apparatus 80 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described methods.

In exemplary aspects, there is also provided a non-transitory computer-readable storage medium including instructions, such as the memory 804 including instructions, the above instructions are executable by the processor 820 in the device 800, for performing the above-described methods. For example, the non-transitory computer-readable storage medium may be a ROM, a RAM, a CD-ROM, a magnetic tape, a floppy disc, an optical data storage device, and the like.

A non-temporary computer readable storage medium enables the apparatus 80 to perform the above-mentioned method for acquiring an ambient light brightness when instructions in the storage medium are executed by the processor of apparatus 80. The method is applied to a terminal device, and an ambient light sensor is disposed at a lower layer of a screen of the terminal device. The method includes:

acquiring a brightness value monitored by the ambient light sensor;

acquiring a luminance value of the screen of the terminal device; and acquiring an ambient light brightness value of an external environment according to the brightness value monitored by the ambient light sensor and the luminance value of the screen of the terminal device.

The acquiring the luminance value of the screen of the terminal device includes:

acquiring a luminance value of a preset display area of the screen of the terminal device, the preset display area on the screen of the terminal device being an area of the screen of the terminal device that affects the ambient light sensor to sense the ambient light brightness of the external environment; and the acquiring the ambient light brightness value of the external environment according to the brightness value monitored by the ambient light sensor and the luminance value of the screen of the terminal device, includes:

acquiring the ambient light brightness value of the external environment according to the brightness value monitored by the ambient light sensor and the luminance value of the preset display area.

The acquiring the luminance value of the preset display area of the screen of the terminal device includes:

acquiring a luminance value of each pixel in the preset display area;

determining an actual luminance influence value of the $i^{th}$ pixel according to a luminance value of the $i^{th}$ pixel and a light intensity influence weight value of the $i^{th}$ pixel with respect to the ambient light sensor, i being an integer greater than 1; and acquiring the luminance value of the preset display area according to the actual luminance influence values of all the pixels.

the acquiring the ambient light brightness value of the external environment according to the brightness value monitored by the ambient light sensor and the luminance value of the preset display area, includes:

calculating a brightness difference value between the brightness value monitored by the ambient light sensor and the luminance value of the display area; and acquiring the ambient light brightness value of the external environment according to the brightness difference value.

The acquiring the ambient light brightness value of the external environment according to the light brightness difference value includes:

acquiring the ambient light brightness value of the external environment according to the brightness difference value and a light transmittance of the screen of the terminal device.

It is noted that the various modules, sub-modules, units, and components in the present disclosure can be implemented using any suitable technology. For example, a module may be implemented using circuitry, such as an integrated circuit (IC). As another example, a module may be implemented as a processing circuit executing software instructions.

Other aspects of the disclosure will be apparent to those skilled in the art from consideration of the specification and practice of the disclosure disclosed here. This application is intended to cover any variations, uses, or adaptations of the disclosure following the general principles thereof and including such departures from the present disclosure as come within known or customary practice in the art. It is intended that the specification and examples be considered as exemplary only, with a true scope and spirit of the disclosure being indicated by the following claims.

It will be appreciated that the present disclosure is not limited to the exact construction that has been described above and illustrated in the accompanying drawings, and that various modifications and changes can be made without departing from the scope thereof. It is intended that the scope of the disclosure only be limited by the appended claims.

What is claimed is:

1. A method for acquiring an ambient light brightness, wherein the method is applied to a terminal device, and an ambient light sensor is disposed at a lower layer of a screen of the terminal device, the method comprising:

acquiring a brightness value monitored by the ambient light sensor;

acquiring a luminance value of the screen of the terminal device; and determining an ambient light brightness value of an external environment based on the brightness value and the luminance value.

2. The method according to claim 1, wherein acquiring the luminance value comprises acquiring the luminance value of a preset display area of the screen of the terminal device, the preset display area on the screen of the terminal device being an area of the screen of the terminal device that affects a sensing ability of the ambient light sensor to sense the ambient light brightness of the external environment; and wherein determining the ambient light brightness value of the external environment comprises determining the ambient light brightness value of the external environment based on the brightness value and the luminance value of the preset display area.

3. The method according to claim 2, wherein acquiring the luminance value of the preset display area of the screen of the terminal device comprises:
acquiring a luminance value of each pixel in the preset display area;
determining an actual luminance influence value of an $i^{th}$ pixel based on a luminance value of the $i^{th}$ pixel and a light intensity influence weight value of the $i^{th}$ pixel with respect to the ambient light sensor, i being an integer greater than 1; and
acquiring the luminance value of the preset display area based on the actual luminance influence values of all the pixels.

4. The method according to claim 2, wherein determining the ambient light brightness value of the external environment based on the brightness value monitored by the ambient light sensor and the luminance value of the preset display area comprises:
calculating a brightness difference value between the brightness value monitored by the ambient light sensor and the luminance value of the display area; and
determining the ambient light brightness value of the external environment based on the brightness difference value.

5. The method according to claim 4, wherein determining the ambient light brightness value of the external environment based on the light brightness difference value comprises determining the ambient light brightness value of the external environment based on the brightness difference value and a light transmittance of the screen of the terminal device.

6. An apparatus for acquiring an ambient light brightness, wherein the apparatus is applied to a terminal device, and an ambient light sensor is disposed at a lower layer of a screen of the terminal device, the apparatus comprising:
a processor; and
a memory for storing instructions executable by the processor;
wherein the processor is configured to:
acquire a brightness value monitored by the ambient light sensor;
acquire a luminance value of the screen of the terminal device; and
determine an ambient light brightness value of an external environment based on the brightness value and the luminance value.

7. The apparatus according to claim 6, wherein the processor is further configured to:
acquire a luminance value of a preset display area of the screen of the terminal device, the preset display area of the screen of the terminal device being an area on the screen of the terminal device that affects a sensing ability of the ambient light sensor to sense the ambient light brightness of the external environment; and
determine the ambient light brightness value of the external environment based on the brightness value and the luminance value of the preset display area.

8. The apparatus according to claim 6, wherein the processor is further configured to:
acquire a luminance value of each pixel in the preset display area;
determine an actual luminance influence value of an $i^{th}$ pixel based on a luminance value of the $i^{th}$ pixel and a light intensity influence weight value of the $i^{th}$ pixel with respect to the ambient light sensor, i being an integer greater than 1; and
acquire the luminance value of the preset display area based on the actual luminance influence values of all the pixels.

9. The apparatus according to claim 7, wherein the processor is further configured to:
calculate a brightness difference value between the brightness value monitored by the ambient light sensor and the luminance value of the display area; and
determine the ambient light brightness value of the external environment based on the brightness difference value.

10. The apparatus according to claim 9, wherein the processor is further configured to:
determine the ambient light brightness value of the external environment based on the brightness difference value and a light transmittance of the screen of the terminal device.

11. A non-transitory computer-readable storage medium having stored thereon instructions, wherein the non-transitory computer-readable storage medium is applied to a terminal device, and an ambient light sensor is disposed at a lower layer of a screen of the terminal device, and when the instructions are executed by a processor of the terminal device, the instructions cause the processor to:
acquire a brightness value monitored by the ambient light sensor;
acquire a luminance value of the screen of the terminal device; and
determine an ambient light brightness value of an external environment based on the brightness value and the luminance value.

12. The computer readable storage medium according to claim 11, wherein the instructions further cause the processor to:
acquire a luminance value of a preset display area of the screen of the terminal device, the preset display area on the screen of the terminal device being an area of the screen of the terminal device that affects a sensing ability of the ambient light sensor to sense the ambient light brightness of the external environment; and
determine the ambient light brightness value of the external environment based on the brightness value and the luminance value of the preset display area.

13. The computer readable storage medium according to claim 12, wherein the instructions further cause the processor to:
acquire a luminance value of each pixel in the preset display area;
determine an actual luminance influence value of an $i^{th}$ pixel based on a luminance value of the $i^{th}$ pixel and a light intensity influence weight value of the $i^{th}$ pixel with respect to the ambient light sensor, i being an integer greater than 1; and
acquire the luminance value of the preset display area based on the actual luminance influence values of all the pixels.

14. The computer readable storage medium according to claim 12, wherein the instructions further cause the processor to:
calculate a brightness difference value between the brightness value monitored by the ambient light sensor and the luminance value of the display area; and determine the ambient light brightness value of the external environment based on the brightness difference value.

15. The computer readable storage medium according to claim 14, wherein the instructions further cause the processor to:
  determine the ambient light brightness value of the external environment based on according to the brightness difference value and a light transmittance of the screen of the terminal device.

* * * * *